United States Patent [19]

McMaster

[11] 4,404,011
[45] Sep. 13, 1983

[54] CONVEYOR ROLL END CAP

[76] Inventor: Ronald A. McMaster, 420 Water St., Woodville, Ohio 43469

[21] Appl. No.: 222,853

[22] Filed: Jan. 6, 1981

[51] Int. Cl.³ .......................................... C03B 35/18
[52] U.S. Cl. .................................. 65/181; 65/118; 65/253; 29/123; 29/126
[58] Field of Search ................ 65/118, 119, 181, 253; 29/123, 126

[56] References Cited

U.S. PATENT DOCUMENTS

| | | | |
|---|---|---|---|
| 2,326,044 | 8/1943 | Littleton | 65/253 |
| 2,950,097 | 8/1960 | Tohir. | |
| 3,806,312 | 4/1974 | McMaster et al. | |
| 3,934,970 | 1/1976 | McMaster et al. | |
| 3,947,242 | 3/1976 | McMaster et al. | |
| 3,994,711 | 11/1976 | McMaster. | |
| 4,140,486 | 2/1979 | Nitschke. | |

FOREIGN PATENT DOCUMENTS 875630 6/1942 France ................................ 29/126
593326 10/1947 United Kingdom ................ 29/123

Primary Examiner—Arthur D. Kellogg
Attorney, Agent, or Firm—Reising, Ethington, Barnard, Perry & Brooks

[57] ABSTRACT

An end cap (18) for use with a conveyor roll (12) of the thermally low expansive ceramic type used to convey hot glass sheets includes a metal sleeve (20) that receives an end (16) of the roll to provide rotational support and/or driving and also includes a retention spring (22) interposed between and engaged with both the roll end and the sleeve in order to retain the sleeve on the roll. The retention spring (22) preferably includes a plurality of leaf springs (44) that are sufficiently deflected at room temperature so as to remain partially deflected upon heating in order to provide the end cap retention.

10 Claims, 4 Drawing Figures

CONVEYOR ROLL END CAP

TECHNICAL FIELD

This invention relates generally to hot glass sheet conveyor rolls of the thermally low expansive ceramic type having an end cap that provides rotational support and/or driving of the roll during use.

BACKGROUND ART

U.S. Pat. No. 3,806,312 discloses a glass sheet tempering system of the horizontal roller conveyor type including a frictional drive mechanism for driving rolls of the conveyor in order to provide conveyance of glass sheets through the heating chamber of a furnace of the system. The rolls of this conveyor span the gap between a pair of spaced horizontally extending surfaces within the heating chamber. A pair of continuous steel belts are respectively supported on and driven over the surfaces with the roll ends resting on the belts such that the belts both support the conveyor rolls with their upper surfaces defining a conveyance plane and also frictionally rotate the rolls upon belt driving in order to provide the conveyance. Upon commercial introduction into the glass tempering industry less than ten years ago, this frictional drive mechanism met with immediate success and is currently utilized in glass tempering systems throughout the world.

U.S. Pat. Nos. 3,934,970, 3,947,242, and 3,994,711 disclose glass tempering systems whose furnaces have roller conveyors of the same basic frictional drive type disclosed by U.S. Pat. No. 3,806,312 but with the ends of the conveyor rolls projecting outwardly from the furnace heating chamber through housing side slots. Upper and lower housings of each of these furnaces define the side slots through which the conveyor roll ends project to external support surfaces that have a much lower temperature than is the case with support surfaces located within the heating chamber. The lower temperature involved with this type of external location facilitates the use of continuous chains with teeth that are positively driven by toothed sheaves as opposed to solid steel belts whose driving force is imparted thereto by friction produced by the wrap tension of the belts about associated driving pulleys. Also, the chains can bend to a smaller radius of curvature than the solid steel belts and thereby permit the use of smaller diameter sheaves than the belt pulleys in order to facilitate packaging of the conveyor.

The conveyor rolls preferably utilized with all of the above discussed patents are made from thermally low expansive ceramic, such as monolithic fused silica or sinter bonded fused silica particles, so as to maintain straightness during heating and thereby provide good planarity of glass sheet conveyance during use. With the type of conveyor located totally within the heating chamber as disclosed by the preferred construction of U.S. Pat. No. 3,806,312 discussed above, it is difficult, if not impossible, to utilize a metal end cap for the ends of the rolls to reduce wear since the differences in coefficients of thermal expansion for the fused silica and the metal and the large temperature differential before and after heating for use would result in nonuniform expansion. Upon introduction of the outwardly projecting type of conveyor roll discussed above, metal end caps could be utilized since the heated temperature of the roll ends thereof normally does not exceed several hundred degrees Fahrenheit as opposed to 1100° to 1200° Fahrenheit for the type of conveyor roll that is located completely within the heating chamber. A high temperature adhesive is utilized to bond the end cap to the roll for use. These metal end caps have to be very precisely machined and the associated conveyor roll ends have to be precisely ground as well as matched with each other so the adhesive bond will remain intact since even the small degree of heating involved results in some greater expansion of the metal end cap than the less expansive fused silica roll.

U.S. Pat. No. 4,140,486 discloses a spring end cap for glass sheet conveyor rolls wherein a helical spring is deflected to increase the diameter thereof for insertion of the roll end thereinto and then released so as to clamp onto the roll and provide rotational support and/or driving of the conveyor roll during use.

Also, U.S. Pat. No. 2,950,097 discloses a conveyor roll for use in steel furnaces wherein a carbon sleeve on which the steel conveyance takes place is supported by corrugated sheets between ends of the roll on a central metal section of the roll. Upon heating, the central metal roll section expands to a greater extent than the carbon sleeve and the corrugated sheets are deflected to a greater extent as the temperature increases.

DISCLOSURE OF INVENTION

An end cap constructed in accordance with the present invention for use with a conveyor roll of the thermally low expansive ceramic type used to convey hot glass sheets includes a metal sleeve that receives an end of the roll to provide rotational support thereof and also includes a retention spring interposed between and engaged with both the roll end and the sleeve in order to retain the sleeve on the roll. The retention spring has a sufficiently deflected condition at room temperature so as to remain partially deflected in engagement with both the roll end and the end cap sleeve upon heating of the roll during conveyance of hot glass sheets whereby the retention spring retains the end cap on the roll end.

In the preferred construction of the end cap, the retention spring comprises a plurality of leaf springs each of which includes a central portion engaged with the roll end and a pair of spaced edges engaged with the end cap sleeve so as to retain the sleeve on the roll end. The leaf springs preferably have the same distance between the spaced edges thereof, and the spaced edges of each spring are respectively located immediately adjacent the edges of the leaf springs on each side thereof so as to define an equilateral polygon between the roll end and the end cap sleeve. A round inner surface of the sleeve is engaged by the edges of the leaf springs and has a diameter smaller than the diameter of the roll conveying portion and equal to the diameter of a circle through the vertices of the equilateral polygon defined by the leaf springs. A round outer friction drive surface of the sleeve has the same diameter as the central conveying portion of the roll such that glass sheets are conveyed at the same speed as the sleeve drive surface upon frictional driving. The end of the roll has a round surface of a diameter smaller than the inner surface of the sleeve so as to define a recess that receives the sleeve. The leaf springs are also received within the roll end recess with the roll end surface engaging the central portion of each leaf spring to provide sufficient outward deflection thereof with respect to the spaced edges of the springs such that the springs remain deflected upon heating of the roll during use.

The sleeve of the end cap preferably includes an outer end extending away from the roll end away from the conveying portion of the roll. A support is mounted by the outer end of the sleeve and a positioning pin is mounted by the support extending outwardly from the sleeve in a concentric relationship with the conveying portion of the roll so as to provide roll positioning upon friction driving. The support for the positioning pin preferably comprises a round plate that closes the outer end of the sleeve and is secured thereto by a welded connection to the sleeve within the outer end thereof with the positioning pin projecting outwardly from within the sleeve away from the conveying portion of the roll.

Both ends of the roll are disclosed as including a pair of identical ends and a pair of the end caps respectively mounted on the ends of the roll. For economy and ease of manufacturing, the ceramic of the roll is sinter bonded fused silica particles although monolithic fused silica can also be utilized.

A complete understanding of the invention is readily apparent from the following detailed description of the best mode for carrying out the invention when taken in connection with the accompanying drawings.

BEST MODE FOR CARRYING OUT THE INVENTION

Figure 1:
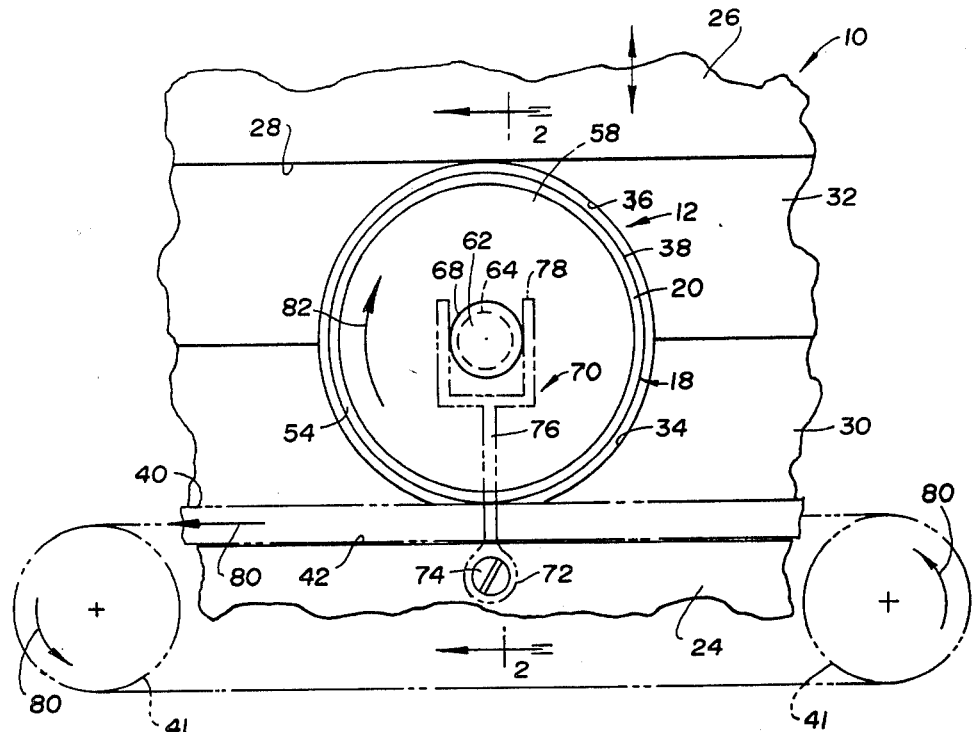
FIG. 1 is a partial side elevation view of a glass sheet heating furnace having a conveyor roll with an end cap constructed in accordance with the present invention.

Referring to FIG. 1 of the drawings, a glass tempering furnace indicated generally by 10 includes a conveyor roll 12 for conveying glass sheets through a heating chamber of the furnace for heating in preparation for a rapid quenching that provides tempering of the glass. Conveyor roll 12 is made of sinter bonded fused silica particles and, as seen by additional reference to FIG. 2, has an elongated shape including an intermediate conveying portion 14 that is located within the heating chamber of the furnace to support and convey glass sheets on its upper side in cooperation with other like rolls upon driving rotation of the rolls. Conveyor roll 12 has opposite ends 16 each of which includes an end cap 18 constructed in accordance with the present invention. End cap 18 includes a metal sleeve 20 that receives the roll end 16 to provide rotational support thereof during use. As best seen in FIG. 3, a retention spring 22 of the end cap is interposed between and engaged with both the roll end 16 and the metal sleeve 20 to retain the sleeve on the roll. Retention spring 22 has a sufficiently deflected condition at room temperature so as to remain partially deflected and in engagement with both the roll end 16 and the sleeve 20 upon heating as the metal sleeve expands radially much more than the fused silica roll end due to their different coefficiencies of thermal expansion. As such, the retention spring 22 retains the end cap 18 on the end of the conveyor roll during conveyance of hot glass sheets.

With reference back to FIG. 1, furnace 10 is of the type illustrated in U.S. Pat. Nos. 3,934,970, 3,947,242, and 3,994,711 wherein the heating chamber is defined by a fixed lower housing 24 and a vertically movable upper housing 26 that has a lower use position defining housing side slots 28 through which the conveyor roll ends project outwardly at opposite sides of the furnace such that the metal end caps 18 respectively associated therewith are located externally at a much lower temperature than in the heating chamber. Heat seals 30 and 32 respectively mounted on the lower and upper housings 24 and 26 have associated semicircular openings 34 and 36 defining a round opening just slightly larger in size than the conveyor roll 12 so as to minimize heat loss to the environment from the heating chamber. A counterbalance mechanism that supports the upper housing 26 for vertical movement permits upward movement thereof to an access position where the heating chamber is accessible for maintenance and/or repair by an operator.

Figure 2:
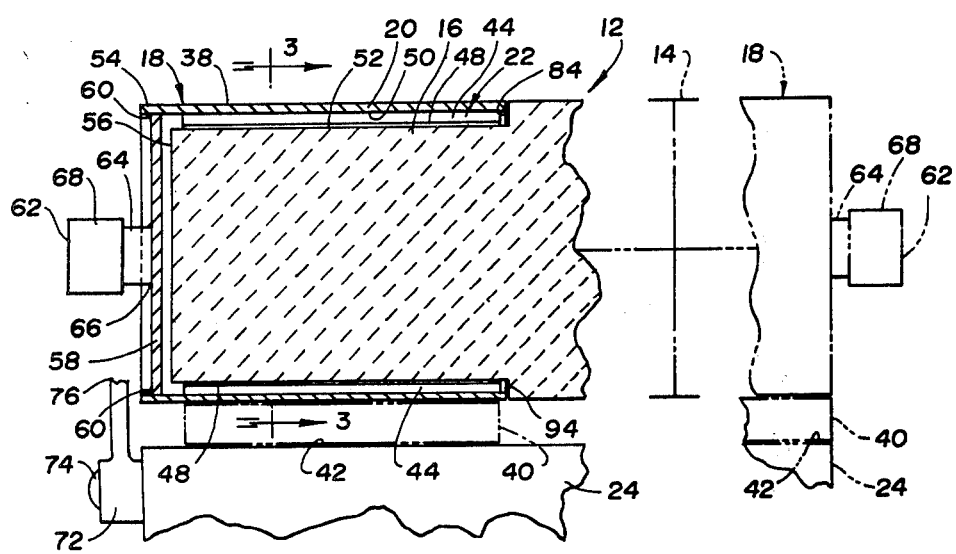
FIG. 2 is a longitudinal sectional view taken through the conveyor roll and end cap thereof along line 2—2 of FIG. 1.
Figure 3:
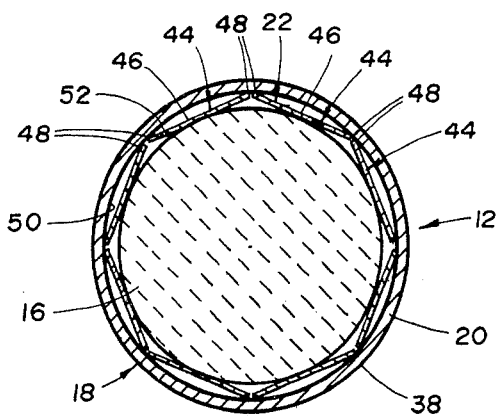
FIG. 3 is a cross sectional view taken through the conveyor roll and end cap thereof generally along line 3—3 of FIG. 2.

As seen by combined reference to FIGS. 1 and 2, an outer friction drive surface 38 of the end cap sleeve 20 has a round shape of the same diameter as the conveying portion 14 of the roll and is supported by the upper side of a continuous drive loop 40 that is received by a pair of rotatable sheaves 41. The lower side of drive loop 40 is slidingly driven over an external support surface 42 of the lower housing 24 at the adjacent side of the furnace.

Retention spring 22 of the end cap preferably includes a plurality of elongated leaf springs 44 shown in FIGS. 2 and 3 for cooperatively maintaining a concentric relationship between the outer friction drive surface 38 and the outer surface of the conveying portion 14 of the roll such that sliding of the drive loop 40 over the support surface 42 rotates the roll about a fixed axis in order to maintain planarity of hot glass sheets during conveyance in their softened condition.

As seen in the cross sectional view of FIG. 3, each leaf spring 44 has a central portion 46 whose inner surface is engaged with the roll end 16 and each leaf spring also includes a pair of spaced edges 48 engaged with the end cap sleeve 20 so as to cooperate with the other springs in positioning the drive surface 38 of the end cap sleeve in its concentric relationship with the conveying portion of the roll. Each leaf spring 44 has the same distance between the spaced edges 48 thereof as each other leaf spring and the edges of each spring are respectively located immediately adjacent the edges of the leaf springs on each side thereof in order to define an equilateral polygonal shape between the roll end 16 and the end cap sleeve 20. Thus, with eight of the leaf springs as shown by the preferred construction, an octagonal shape is defined by the leaf springs 44.

An inner surface 50 of sleeve 20 is shown in FIG. 3 as having a round shape that is engaged by the edges 48 of the leaf springs 44. The diameter of the inner sleeve surface 50 is thus equal to the diameter of a circle intersecting the vertices of the equilateral polygon defined by the leaf springs 44. Conveyor roll end 16 has a round outer surface 52 with a diameter smaller than the inner surface 50 of the metal sleeve 20 so as to define a roll end recess that receives the sleeve as well as the leaf springs 44 between the roll end and the sleeve. The roll end surface 52 engages the central portion 46 of each leaf spring 44 to provide sufficient outward radial deflection thereof with respect to the spaced edges 48 such that the leaf springs remain deflected upon heating of the roll during use in order to retain the end cap on the roll.

With reference to FIG. 3, the end 16 of the conveyor roll has relatively zero expansion during heating whereas the metal sleeve 20 expands radially due to its greater coefficient of thermal expansion. Thus, the radial distance between the roll end surface 52 and the inner sleeve surface 50 becomes larger upon heating. Leaf springs 44 of the retention spring 22 must have a sufficiently deflected condition at room temperature so as to remain in engagement with both the roll end and the sleeve upon heating in order to retain the end cap on the roll.

Referring back to FIGS. 1 and 2, sleeve 20 of the end cap 18 includes an outer end 54 extending outwardly from an axial end surface 56 of the roll end 16 in a direction away from the conveying portion 14 of the roll. A support embodied by a round plate 58 is received within the outer sleeve end 54 as best seen in FIG. 2 and secured thereto by a welded connection 60 with the plane of the support plate perpendicular to the axis of roll rotation. A positioning pin 62 has a reduced size inner end 64 that is secured by a welded connection 66 to the plate 58 which thus provides a support for the pin with respect to the sleeve 20. Positioning pin 62 also has an outer end 68 that is located with respect to the direction of conveyance by a positioner 70 illustrated in FIG. 1. A lower end 72 of the positioner 70 is mounted on the lower furnace housing 24 at the outboard side of the support surface 42 in any suitable manner such as by the bolt 74 illustrated with an intermediate shank 76 thereof projecting upwardly toward the positioning pin 62. An upper end 78 of the positioner 70 has a squared U-shape that receives the positioning pin 62 between the vertical legs thereof in order to prevent movement of the conveyor roll 12 along the direction of conveyance. Thus, driving movement of the drive loop 40 toward the left in the direction shown by arrows 80 rotates the roll 12 in clockwise as shown by arrow 82 in order to provide glass sheet conveyance toward the right in the opposite direction the drive loop is moved. Since the outer surface 38 of the end cap sleeve 20 has the same diameter at the intermediate conveying portion 14 of the roll, the speed of conveyance is equal to the speed at which the drive loop 40 is moved over the support surface 42.

Provision of the end cap 18 on both ends of the conveyor roll 12 and frictional driving thereof by a pair of continuous drive loops that are maintained taut maintains planarity of the upper sides of each roll of the furnace conveyor in order to maintain the glass sheets conveyed in a planar condition despite their softened state. Metal sleeve 20 of the end cap 18 is harder than the sinter bonded fused silica particles of the conveyor roll 12 such that there is substantially less wear than would be the case if the roll end were not provided with any end cap. Also, the positioning pin 62 mounted by the end cap 18 with the retention spring 22 maintains the axis of rotation in a fixed position during the roll rotation in order to provide a uniform speed of conveyance.

Figure 4:
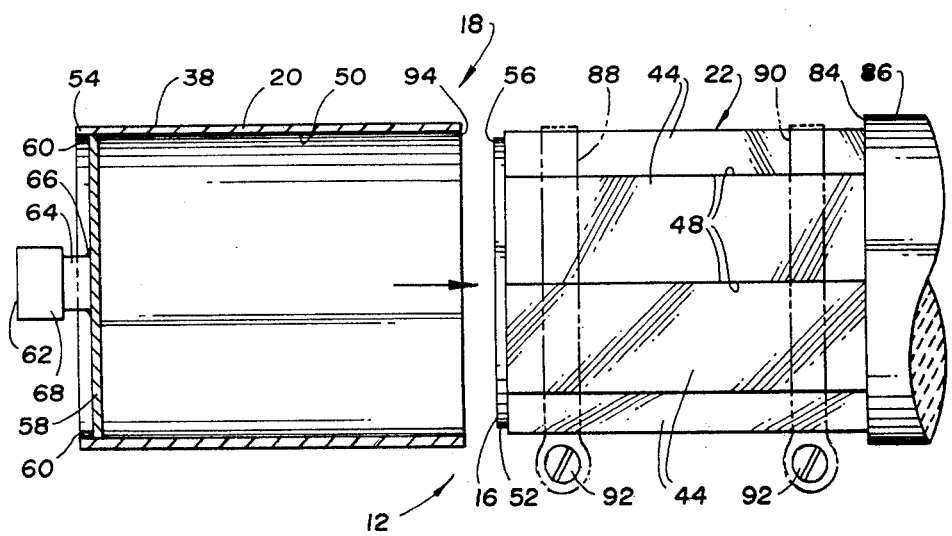
FIG. 4 is a view illustrating the manner in which the end cap is assembled to the conveyor roll end.

Referring to FIG. 4, the end cap 18 is assembled by initially positioning the leaf springs 44 on the roll end 16 extending from the axial end surface 56 thereof toward the annular axial surface 84 between the round end surface 52 and the outer roll surface 86 whose diameter is the same as the central conveying portion of the roll. A pair of conventional hose clamps 88 and 90 are utilized to secure the leaf springs 44 on the roll end 16.

Screws 92 of the clamps 88 and 90 are tightened sufficiently to deflect the edges 48 of the leaf springs 44 inwardly with respect to the central portions 46 thereof such that the inward end 94 of the metal sleeve 20 can be inserted over the left end of the leaf springs. The clamp 88 is then released and removed from the roll end in order to permit the metal sleeve 20 to be inserted further over the roll end 16. Clamp 90 is removed and released after such further insertion so as to permit the metal sleeve 20 to be moved to its FIG. 2 assembled position where the leaf springs 44 of the retention spring 22 cooperate to secure the end cap in the manner previously described.

While the best mode for carrying out the invention has herein been described in detail, those familiar with the art to which this invention relates will recognize various alternative designs and constructions for carrying out the present invention as defined by the following claims.

What is claimed is:

1. A hot glass sheet conveyor roll made of thermally low expansive ceramic with an elongated shape including an intermediate conveying portion of a round cross-section and also including at least one end with an end cap comprising: a metal sleeve that receives the end of the roll to provide rotational support thereof; and a retention spring interposed between and engaged with both the end of the roll and the sleeve of the end cap to retain the sleeve on the roll end, and said retention spring having a sufficiently deflected condition at room temperature such that upon heating of the roll and its end cap the retention spring remains partially deflected in engagement with both the roll end and the end cap sleeve whereby the retention spring retains the end cap on the roll end and prevents relative rotation between the end cap and the roll end.

2. A roll as in claim 1 wherein the retention spring comprises a plurality of leaf springs each of which includes a central portion engaged with the roll end, and each leaf spring also including a pair of spaced edges engaged with the end cap sleeve such that the leaf springs cooperatively retain the sleeve on the roll end.

3. A roll as in claim 2 wherein each leaf spring has the same distance between the spaced edges thereof as each other leaf spring and the spaced edges of each leaf spring being respectively located immediately adjacent the edges of the leaf springs on each side thereof so as to define an equilateral polygon between the roll end and the end cap sleeve, the end cap sleeve having a round outer friction drive surface and also having a round inner surface that is engaged by the spaced edges of the leaf springs and has a diameter equal to the diameter of a circle through the vertices of the equilateral polygon defined by the leaf springs, the round outer drive surface of the sleeve having the same diameter as the conveying portion of the roll and being located in a concentric relationship therewith such that glass sheets are conveyed at the same speed as the speed of the friction drive surface, and the roll end having a round surface of a diameter smaller than the inner surface of the sleeve so as to receive the leaf springs therebetween with the roll end surface engaging the central portion of each leaf spring to provide sufficient outward deflection thereof with respect to the spaced edges thereof such that the leaf springs remain deflected upon heating of the roll during use.

4. A roll as in claim 3 wherein the sleeve of the end cap includes an outer end extending outwardly from the roll end away from the conveying portion of the roll, a support mounted by the outer end of the sleeve, and a positioning pin mounted on the support extending outwardly from the sleeve in a concentric relationship with the conveying portion of the roll.

5. A roll as in claim 4 wherein the support for the positioning pin comprises a round plate, and a welded connection that secures the plate to the sleeve within the outer end thereof with the positioning pin projecting outwardly from within the sleeve away from the conveying portion of the roll.

6. A roll as in claim 4 having a pair of identical ends and a pair of the end caps respectively mounted on said ends of the roll.

7. A hot glass sheet conveyor roll made of sinter bonded fused silica with an elongated shape including an intermediate conveying portion with a round cross-section and at least one end with an end cap comprising: a unitary metal sleeve of an elongated annular shape that receives the end of the roll; said sleeve having a round outer friction drive surface with the same diameter as the conveying portion of the roll and also having a round inner surface within which the roll end is received; said roll end having a round cross-section with a diameter smaller than the diameter of the inner surface of the sleeve so as to define a roll end recess that receives the sleeve in a spaced relationship thereto; and a retention spring interposed between and engaged with both end of the roll and the inner surface on the sleeve of the end cap to locate the round outer drive surface of the sleeve in a concentric relationship with the conveying portion of the roll, and said retention spring having a sufficiently deflected condition at room temperature such that upon heating of the roll and its end cap the retention spring remains partially deflected in engagement with both the roll end and the inner surface on the end cap sleeve whereby the retention spring retains the end cap sleeve on the roll end and prevents relative rotation therebetween as well as maintaining the concentricity of the round drive surface of the end cap sleeve and the conveying portion of the roll.

8. A hot glass sheet conveyor roll made of sinter bonded fused silica with an elongated shape including an intermediate conveying portion with a round cross-section and at least one end with an end cap comprising: a unitary metal sleeve of an elongated annular shape that receives the end of the roll; said sleeve having a round outer friction drive surface with the same diameter as the conveying portion of the roll and also having a round inner surface within which the roll end is received; said sleeve having an outer end extending outwardly away from the end of the roll; said roll end having a round cross-section with a diameter smaller than the diameter of the inner surface of the sleeve so as to define a roll end recess that receives the sleeve in a spaced relationship thereto; a retention spring including a plurality of leaf springs each of which includes a central portion engaged with the roll end and a pair of spaced edges engaged with the inner surface on the unitary sleeve of the end cap so as to locate the round outer drive surface of the sleeve in a concentric relationship with the conveying portion of the roll; each leaf spring being sufficiently deflected at room temperature such that upon heating of the roll and its end cap the leaf springs remain partially deflected in engagement with both the roll end and the inner surface of the end cap sleeve whereby the leaf springs cooperatively secure the end cap to the roll end to prevent relative rotation therebetween while maintaining the outer drive surface of the sleeve concentric with the conveying portion of the roll; a support mounted by the outer end of the sleeve; and a positioning pin mounted by the support extending outwardly from the sleeve such that the pin and conveying portion of the roll are maintained in a concentric relationship by the leaf springs.

9. A glass sheet conveyor roll made of sinter bonded fused silica and having opposite ends and a pair of end caps respectively associated therewith, each roll end and associated end cap comprising: a metal sleeve of an elongated annular shape that receives the end of the roll; said sleeve having a round outer friction drive surface with the same diameter as the conveying portion of the roll and also having a round inner surface within which the roll end is received; said sleeve having an outer end extending away from the end of the roll; said roll end having a round cross-section with a diameter smaller than the diameter of the inner surface of the sleeve so as to define a roll end recess that receives the sleeve in a spaced relationship thereto; a retention spring including a plurality of leaf springs each of which includes a central portion engaged with the roll end and a pair of spaced edges respectively positioned immediately adjacent the edges of the leaf springs on each side thereof and engaged with the inner surface of the unitary metal sleeve of the end cap so as to locate the round outer drive surface of the end cap sleeve in a concentric relationship with the conveying portion of the roll; each leaf spring having the same distance between the spaced edges thereof as each other leaf spring and being sufficiently deflected at room temperature such that upon heating of the roll and its end cap the leaf springs remain partially deflected in engagement with both the roll end and the inner surface of the end cap sleeve whereby the leaf springs cooperatively secure the end cap to the roll end to prevent relative rotation therebetween while maintaining the outer drive surface concentric with the conveying portion of the roll; a support mounted by the outer end of the sleeve; and a positioning pin mounted by the support extending outwardly from the sleeve such that the pin and conveying portion of the roll are maintained in a concentric relationship by the leaf springs.

10. A glass sheet conveyor roll made of sinter bonded fused silica and having opposite ends and a pair of end caps respectively associated therewith, each roll end and associated end cap comprising: a unitary metal sleeve of an elongated annular shape that receives the end of the roll; said sleeve having a round outer friction drive surface with the same diameter as the conveying portion of the roll and also having a round inner surface within which the roll end is received; said sleeve having an outer end extending away from the end of the roll; said roll end having a round cross-section with a diameter smaller than the diameter of the inner surface of the sleeve so as to define a roll end recess that receives the sleeve in a spaced relationship thereto; a retention spring including a plurality of leaf springs each of which includes a central portion engaged with the roll end and a pair of spaced edges respectively positioned immediately adjacent the edges of the leaf springs on each side thereof and engaged with the inner surface of the unitary metal sleeve of the end cap so as to locate the round outer drive surface of the end cap in a concentric relationship with the conveying portion of the roll; each leaf spring having the same distance between the spaced edges thereof as each other leaf spring and being sufficiently deflected at room temperature such that upon heating of the roll and its end cap the leaf springs remain partially deflected in engagement with both the roll end and the inner surface of the end cap sleeve whereby the leaf springs cooperatively secure the end cap to the roll end to prevent relative rotation therebetween while maintaining the outer drive surface concentric with the conveying portion of the roll; a support including a round plate received within the outer end of the sleeve; a welded connection that secures the support plate to the inner surface of the metal sleeve; and a positioning pin mounted by the support plate extending outwardly from the sleeve such that the pin and conveying portion of the roll are maintained in a concentric relationship by the leaf springs.

* * * * *

UNITED STATES PATENT AND TRADEMARK OFFICE
CERTIFICATE OF CORRECTION

PATENT NO. : 4,404,011

DATED : September 13, 1983

INVENTOR(S) : Ronald A. McMaster

It is certified that error appears in the above—identified patent and that said Letters Patent is hereby corrected as shown below:

Column 7, line 29, Claim 7
after "both", insert --the--.

Signed and Sealed this

Twenty-fourth Day of January 1984

[SEAL]

Attest:

GERALD J. MOSSINGHOFF

Attesting Officer   Commissioner of Patents and Trademarks